United States Patent [19]

Obayashi et al.

[11] Patent Number: 4,615,991

[45] Date of Patent: Oct. 7, 1986

[54] METHOD FOR RECOVERING DENITRATING CATALYST

[75] Inventors: Yoshiaki Obayashi; Shigeaki Mitsuoka, both of Hiroshima, Japan

[73] Assignee: Mitsubishi Jukogyo Kabushiki Kaisha, Tokyo, Japan

[21] Appl. No.: 719,163

[22] Filed: Apr. 2, 1985

[30] Foreign Application Priority Data

Apr. 3, 1984 [JP] Japan ............................ 59-65268
Apr. 3, 1984 [JP] Japan ............................ 59-65269

[51] Int. Cl.$^4$ .................. B01J 38/62; B01J 23/92; B01J 21/20; C01B 21/00
[52] U.S. Cl. ........................ 502/28; 423/239; 502/27; 502/515; 502/516
[58] Field of Search ............ 502/28, 515, 517, 309, 502/25, 26, 27, 516; 423/239 A

[56] References Cited

U.S. PATENT DOCUMENTS

| 2,380,731 | 7/1945 | Drake et al. | 502/28 |
| 4,522,928 | 6/1985 | McVicker et al. | 502/28 |

FOREIGN PATENT DOCUMENTS

| 27091 | 3/1977 | Japan | 502/515 |
| 3872 | 1/1980 | Japan | 502/309 |

Primary Examiner—P. E. Konopka
Attorney, Agent, or Firm—Holman & Stern

[57] ABSTRACT

A method for recovering a denitrating catalyst which is characterized by washing, with an aqueous oxalic acid solution, the used tungsten-titania or the tungsten-titania-vanadium denitrating catalyst which dust components have adhered to or have accumulated on and in which an $SO_2$-oxidizing power has thus risen; impregnating the catalyst with a tungsten compound; and drying and calcining the thus treated catalyst.

3 Claims, 6 Drawing Figures

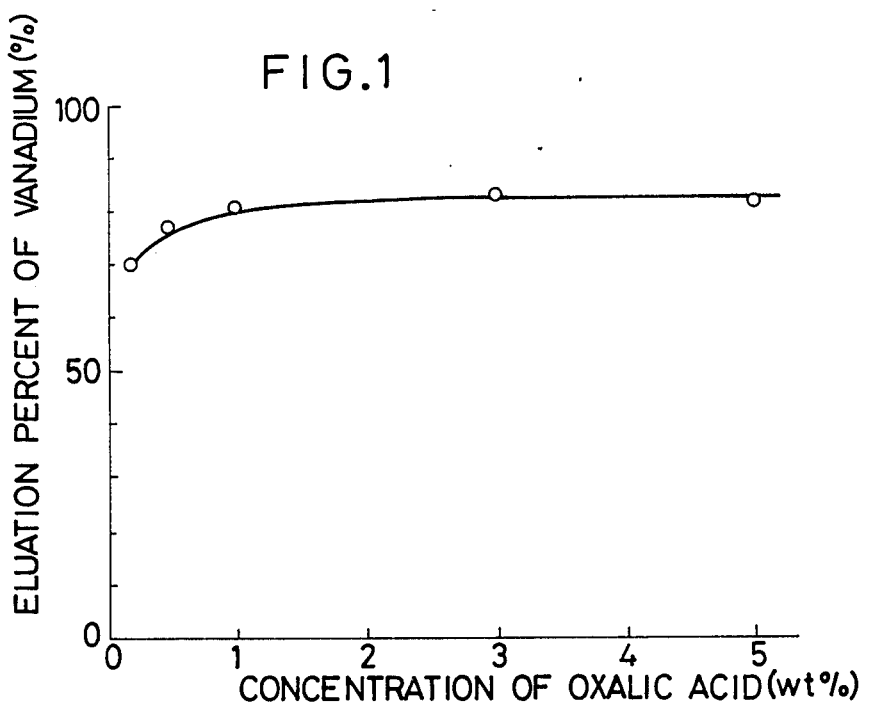
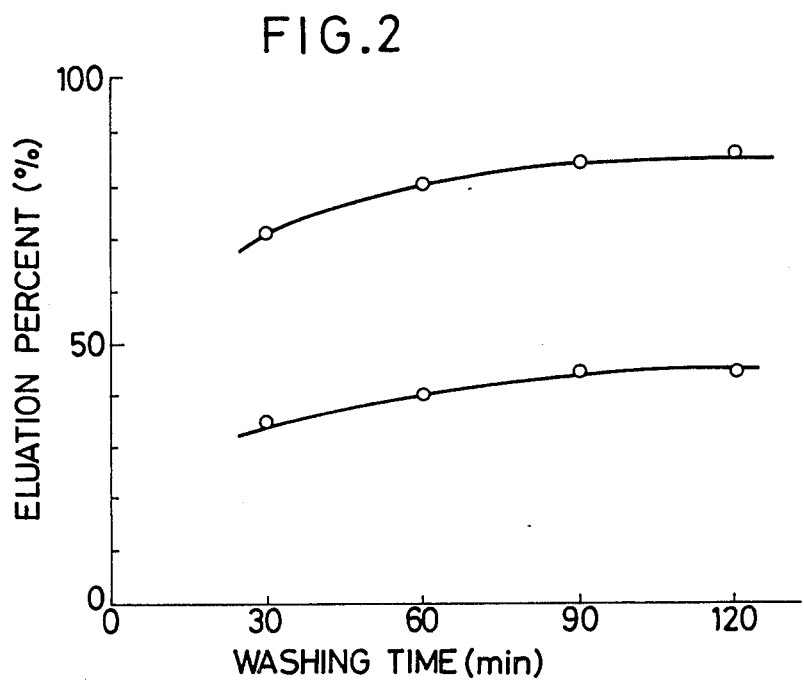

METHOD FOR RECOVERING DENITRATING CATALYST

The present invention relates to a method for recovering a catalyst (hereinafter referred to as the denitrating catalyst) for removing a nitrogen oxide from an exhaust gas, and more specifically to a method for recovering a tungsten-titania or tungsten-titania-vanadium catalyst for removing a nitrogen oxide (hereinafter referred to as NOx) from an exhaust gas by the use of ammonia as a reducing agent.

In recent years, much attention has been paid to the NOx compound present in an exhaust gas which is one component of causing photochemical smog, and there have been suggested a variety of methods for removing the NOx component. Of these methods, the catalytic reduction technique has already been realized by which NOx is reduced to harmless nitrogen in the presence of a catalyst by the use of ammonia as a reducing agent. In this technique, a vanadium-titania series is generally used as the catalyst having an excellent activity. However, in treating an exhaust gas from a boiler in which a heavy oil (C heavy oil) containing a high content of sulfur is used, a high concentration of sulfurous acid gas (hereinafter referred to as $SO_2$) is present in a treated gas. Therefore, simultaneously with the reducing and removing reaction of NOx, an oxidizing reaction of $SO_2$ to sulfur trioxide (hereinafter referred to as $SO_3$) occurs to generate a high concentration of $SO_3$. The latter compound easily bonds to an unreacted content of $NH_3$ which has been employed as a reducing agent, in a low-temperature zone in order to produce acidic ammonium sulfate and others, so that a heat exchanger and the like tend to be clogged with the product. If the prevention against such a clogging is contemplated, a dust collector must be powered up. Accordingly, for the purpose of inhibiting this oxidizing reaction of $SO_2$ to the utmost, many $SO_2$ oxidation-inhibiting type tungsten-titania catalysts and tungsten-titania-vanadium catalysts have been adopted. However, in a combustion exhaust gas of a heavy oil containing sulfur in large quantities, there exist a dust containing heavy metals such as vanadium, nickel and iron as well as an alkaline salt such as Glauber's salt, and these components in the dust thus adhere to and accumulate on the surface of the catalyst during the long-term treatment of the exhaust gas. In consequence, in the case of the tungsten-titania catalyst, $SO_2$-oxidizing power will be elevated, though the denitrating power will scarcely vary, and in the case of the tungsten-titania-vanadium catalyst, the denitrating power will lower and the $SO_2$-oxidizing power will rise.

The inventors of the present application have intensively researched the performance drop of the denitration and the rise phenomenon of the $SO_2$-oxidizing ability on the catalyst used practically in a plant, and it has consequently been found that the performance deterioration of the catalyst would mainly be attributable to the accumulation of alkaline components such as Na and K contained in the dust in the exhaust gas on the catalyst, and the rise of the $SO_2$-oxidizing power would chiefly be caused thereon by the deposition of vanadium present in the dust in the exhaust gas. The catalyst in which the denitrating performance has thus deteriorated and the $SO_2$-oxidizing power has risen is generally subjected to a dust removal treatment by the blast of compressed air and water washing or washing with an aqueous inorganic acid solution in order to lower the $SO_2$-oxidizing power. The above-mentioned washing treatment permits removing water-soluble accumulated components and the dust, and thus recovering the denitrating power appreciably. Indeed, such a washing treatment is effective to some extent. However, most of vanadium compounds which will raise the $SO_2$-oxidizing power remain on the catalyst, therefore its recovery degree is not at the level of the unused new catalyst.

The present inventors have investigated a recovery method of the tungsten-titania catalyst and the tungsten-titania-vanadium catalyst, and they have eventually found that when the tungsten-titania catalyst having a risen $SO_2$-oxidizing power and the tungsten-titania-vanadium catalyst having a dropped denitrating performance and the risen $SO_2$-oxidizing power are brought into contact with an aqueous oxalic acid solution, most of the vanadium compounds which will raise the $SO_2$-oxidizing power can be eluted forcedly. In this case, the $SO_2$-oxidizing power can be recovered to a level comparable to that of the unused catalyst, but the denitrating ability will deteriorate since a part of the tungsten which is an active component is eluted during the above-mentioned treatment. In view of the fact, the present inventors have further observed through their researches that if the catalyst, after washing, is impregnated with the tungsten compound, which is the active component, and is then dried and calcined, the catalyst can be recovered satisfactorily, and the present invention has now been completed.

That is to say, the present invention is directed to a method for recovering, a used tungsten-titania denitrating catalyst in which the $SO_2$-oxidizing power has risen by adhesion or accumulation of dust components, the method being characterized by washing the used denitrating catalyst with an aqueous oxalic acid solution; impregnating the catalyst with a tungsten compound supportingly; and drying and calcining it.

Further, the present invention is directed to a method for recovering a used tungsten-titania-vanadium denitrating catalyst in which a denitrating performance has dropped and the $SO_2$-oxidizing power has risen by adhesion or accumulation of dust components, the method being characterized by washing the catalyst with water or an aqueous dilute inorganic acid solution; further washing it with an aqueous oxalic acid solution; impregnating the catalyst with a tungsten compound; and drying and calcining it.

FIG. 1 is a graph illustrating an elution percent of vanadium to a concentration of oxalic acid in the case that a used tungsten-titania catalyst is washed with an aqueous oxalic acid solution;

FIG. 2 is a graph illustrating elution percents of vanadium and tungsten to a washing time in the case that the 1.0 wt % aqueous oxalic acid solution is used;

Figure 3:
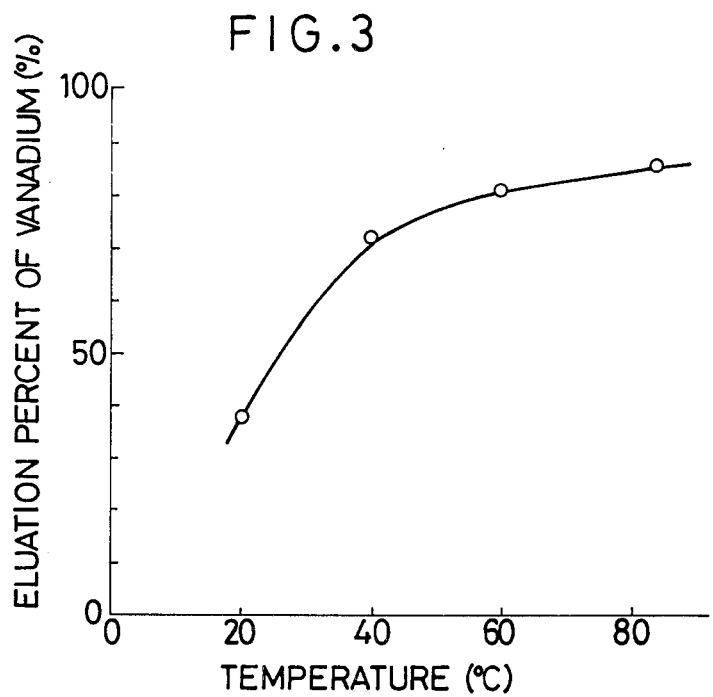
FIG. 3 is a graph illustrating an elution percent of vanadium to a temperature in the case that the 1.0 wt % aqueous oxalic acid solution is used and washing is carried out for a period of 60 minutes.

A used tungsten-titania catalyst to which the present invention can be applied means a catalyst in which the $SO_2$-oxidizing power has risen as a result of a long-term service as a denitrating catalyst for an NOx-containing exhaust gas.

Further, a used tungsten-titania-vanadium catalyst means a catalyst in which a denitrating power has deteriorated and the $SO_2$-oxidizing power has risen as a result of a long-term service as the denitrating catalyst for the NOx-containing exhaust gas.

Particularly, the present invention can be effectively applied to the used tungsten-titania catalyst in which the $SO_2$-oxidizing power has risen owing to the denitration treatment of a dirty exhaust gas containing SOx and a dust from a COM-fired or a heavy oil-fired boiler, or the used tungsten-titania-vanadium catalyst in which the performance has deteriorated and the $SO_2$-oxidizing power has risen owing to the denitration treatment. The above-mentioned tungsten-titania catalyst can be prepared by a method of supportingly impregnating a molded titania carrier with a tugnsten compound, a method of mixing a titania powder with a tungsten compound powder in the presence of a binder and molding the resultant mixture, or another method. Further, the tungsten-titania-vanadium catalyst can be prepared by a method of supportingly impregnating a molded titania carrier with a vanadium compound and a tugnsten compound, a method of mixing a titania powder with a tungsten compound powder and a vanadium compound powder in the presence of a binder and molding the resultant mixture, or another method.

In the catalyst, the vanadium component and the tungsten component are generally contained in amounts of 0.1 to 2.0 wt % and 5 to 24 wt %, respectively. Active components other than vanadium and tungsten may be contained in the catalyst, and the method of the present invention can be applied to the used tungsten-titania and tungsten-titania-vanadium catalysts comprising any composition. Further, the present invention is also applicable to catalysts having optional shapes such as granule, cylinder, ellipse, plate, pipe, lattice and honeycomb.

In most cases, a dust adheres to and accumulates on the used tungsten-titania or tungsten-titania-vanadium catalyst, therefore it must be previously removed by washing the catalyst with water or a dilute aqueous inorganic acid solution. At this time, water-soluble catalyst poisons, for example, heavy metals such as iron and nickel and an alkaline salt such as Glauber's salt contained in the dust are removed together, which fact is convenient and effective. Especially in the used tungsten-titania-vanadium catalyst, such a fact is effective for the recovery of a denitration performance. However, in the used tungsten-titania catalyst, such a pretreatment is not a necessary requirement.

The extraction of a vanadium component from the used tungsten-titania catalyst with an aqueous oxalic acid solution is carried out by dipping it into the aqueous oxalic acid solution having an oxalic acid concentration of 0.1 to 5.0 wt %, preferably 0.5 to 3.0 wt % at a temperature of ordinary temperature to 100° C., preferably 40 to 70° C. Further, the extraction of a vanadium component from the used tungsten-titania-vanadium catalyst with an aqueous oxalic acid solution is carried out by dipping it into the aqueous oxalic acid solution having an oxalic acid concentration of 0.1 to 5.0 wt %, preferably 0.5 to 3.0 wt % at a temperature of ordinary temperature to 80° C., preferably 20 to 60° C., and in both the cases, the vanadium component can be extracted as vanadyl oxalate.

A period of time taken to carry out the extraction treatment is generally 30 to 120 minutes, depending on a temperature, a concentration and an amount of the aqueous oxalic acid solution, a degree of stirring and a kind of used vanadium compound. The catalyst in which the dust and the accumulated components have been removed by the above-mentioned washing is then impregnated with a tungsten compound.

This impregnation of the tungsten compound is carried out by dipping the titania carrier into an aqueous monoethanolamine or monomethanol solution of ammonium paratungstate, ammonium metatungstate or the like, alternatively spraying it with such an aqueous solution. The titania carrier thus impregnated with the tungsten compound is then dried and calcined in order to thereby prepare the recovered tungsten-titania-vanadium catalyst.

As is apparent from the foregoing, the present invention permits recovering the tungsten-titania catalyst, in which the $SO_2$-oxidizing power has risen, to a level equivalent to the unused catalyst without impairing its shape, and also recovering the tungsten-titania-vanadium catalyst, in which the denitration performance has deteriorated and the $SO_2$-oxidizing power has risen, to a level equivalent to the unused catalyst without impairing its shape.

Now, the present invention will be described in detail in the examples.

EXAMPLE 1

By the use of a honeycomb catalyst containing 15 wt % of $WO_3$ and 85 wt % of $TiO_2$, an exhaust gas from a boiler was treated for 1 year and 4 months under the conditions which follow. As a result, an oxidization rate of $SO_2$ at 380° C. rose from an initial rate of 0.1% to 2.0%, and $V_2O_5$ was accumulated on the catalyst in a ratio of 0.9 wt %. A removal rate of NOx was 80%, the value of which was unchanged.

Treatment conditions of the exhaust gas:

| | |
|---|---|
| Amount of the gas to be treated | 2,000 m³/h |
| Temperature | 330 to 390° C. |
| Space velocity | 4,000 1/h |
| $NH_3/NO_x$ ratio | 1.00 |
| $NO_x$ | 2,000 ppm |
| $SO_x$ | 2,000 ppm |

This catalyst in which the $SO_2$-oxidizing power had risen was dipped into water and warm water a volume of which was 4 times as much as an apparent volume (calculated from an outside size) of the catalyst, and was washed for a period of 30 to 90 minutes. The used washing water was colored orange due to the elution of vanadium. Chemical analysis was then carried out and the results indicate that vanadium was eluted as much as 10 to 20% in the washing water. However, tungsten was scarcely eluted under any condition. After the washing operation, the catalyst was dried (Comparative Example 1). An $SO_2$ oxidization rate was measured where an amount of the gas to be treated was 1/100 of the above-mentioned treatment conditions, and the results indicate that the $SO_2$ oxidization percent was not recovered completely, as set forth in the column of Comparative Example 1 in Table 1. Afterward, the catalyst used in Comparative Example 1 was then dipped into an oxalic acid solution (60° C.) a volume of which was 4 times as much as an apparent volume of the catalyst, and was washed for 60 minutes. At this time, an elution rate of vanadium from the catalyst varied with a concentration of oxalic acid, as shown in FIG. 1. As is apparent from FIG. 1, 80% of the accumulated vanadium was eluted at an oxalic acid concentration of 1.0% and its elution percent did not increase even when the oxalic acid concentration was further heightened. The catalyst which had been washed with the aqueous oxalic acid solution was then dried (Comparative Example 2). The $SO_2$ oxidization rate was measured, and the results are set forth in the column of Comparative Example 2 in Table 1. As is apparent from the table, the $SO_2$ oxidization rate was recovered up to a level equal to an initial value but an $NO_x$ removal rate lowered.

The catalyst which had been used in Comparative Example 2 was then impregnated with an aqueous ammonium paratungstate solution which was prepared so as to be impregnated with 5 wt % of a tungsten component in terms of $WO_3$, and drying and calcination were then carried out. The $SO_2$ oxidization rate and the $NO_x$ removal rate were measured, and the results are set forth in the column of Example 1 in Table 1. As is apparent from Table 1, the $SO_2$ oxidization rate and the $NO_x$ removal rate were recovered up to levels equal to initial values.

TABLE 1

| | $SO_2$ oxidization rate/$NO_x$ removal rate | | | | |
|---|---|---|---|---|---|
| | Temp. of water | | | | |
| | Ordinary temperature | | | 40° C. | 60° C. |
| | Washing time | | | | |
| | 30 min | 60 min | 90 min | 60 min | 60 min |
| Comparative Example 1 (only water washing) | 1.8/— | 1.6/— | 1.3/— | 1.1/— | 0.9/— |
| Comparative Example 2 | 0.4/71 | 0.3/71 | 0.2/70 | 0.2/70 | 0.1/67 |
| Example 1 | 0.2/82 | 0.1/80 | 0.1/81 | 0.1/80 | 0.1/79 |

EXAMPLE 2

A catalyst prepared in the same manner as in Example 1 in which the $SO_2$-oxidizing power had risen was dipped into a 0.1 N aqueous sulfuric acid solution (20° C.) for 60 minutes a volume of which was 4 times as much as an apparent volume of the catalyst, and was washed. Afterward, washing was further carried out with an oxalic acid solution in the same manner as in Example 1, and the catalyst was impregnated with tungsten, followed by drying and calcination. An $SO_2$ oxidization rate and an $NO_x$ removal rate were measured under the same conditions as in Example 1, and their values obtained as results were 0.2% and 79%, respectively.

EXAMPLE 3

A catalyst prepared in the same manner as in Example 1 in which the $SO_2$-oxidizing power had risen was dipped into a 1.0 wt % aqueous oxalic acid solution (60° C.) a volume of which was 4 times as much as an apparent volume of the catalyst, and was washed for a predetermined period of time. At this time, elution percents of vanadium and tungsten from the catalyst varied as shown in FIG. 2. In FIG. 2, a curve having white circles and a curve having half-blackened circles represent elution rate curves of vanadium and tungsten, respectively. The thus washed catalyst was impregnated with tungsten, followed by drying and calcination. An $SO_2$ oxidization rate and an $NO_x$ removal rate were then measured under the same conditions as in Example 1, and the results shown in Table 2 indicate that the $SO_2$ oxidization rate and the $NO_x$ removal rate were both recovered up to a level equal to initial values.

TABLE 2

| Washing time | 30 | 60 | 90 | 120 |
|---|---|---|---|---|
| $SO_2$ oxidation rate | 0.3 | 0.2 | 0.1 | 0.1 |
| $NO_x$ removal rate | 80 | 79 | 79 | 78 |

EXAMPLE 4

A catalyst prepared in the same manner as in Example 1 in which the $SO_2$-oxidizing power had risen was dipped into a 1.0 wt % aqueous oxalic acid solution for 60 minutes a volume of which was 4 times as much as an apparent volume of the catalyst, and was washed. At this time, an elution percent of vanadium varied as shown in FIG. 3. The thus washed catalyst was impregnated with tungsten, followed by drying and calcination. An $SO_2$ oxidization rate and an $NO_x$ removal rate were then measured under the same exhaust gas treatment conditions as in Example 1, and the results shown in Table 3 indicate that the $SO_2$ oxidization rate and the $NO_x$ removal rate were both recovered up to levels equal to initial values when a temperature of the aqueous oxalic acid solution was within the range of 40 to 80° C.

TABLE 3

| Temp. of aq. oxalic acid sol. | 20° C. | 40° C. | 60° C. | 80° C. |
|---|---|---|---|---|
| $SO_2$ oxidation rate | 0.5 | 0.2 | 0.2 | 0.1 |
| $NO_x$ removal rate | 80 | 80 | 79 | 78 |

EXAMPLE 5

By the use of a honeycomb catalyst containing 12.5 wt % of $WO_3$, 87.0 wt % of $TiO_2$ and 0.5% of $V_2O_5$, an exhaust gas from a boiler was treated for 1 year and 4 months under below written conditions. As a result, an $NO_x$ removal rate lowered from an initial rate of 80% to 74.5% and an $SO_2$ oxidization rate rose from an initial rate of 0.5% to 3.0%, and $V_2O_5$ was accumulated on the catalyst in a ratio of 0.9 wt %.

Treatment conditions of the exhaust gas:

| Amount of the gas to be treated | 2,000 m³/h |
|---|---|
| Temperature | 330 to 390° C. |
| Space velocity | 4.000 1/h |
| $NH_3/NO_x$ ratio | 1.00 |
| $NO_x$ | 200 ppm |
| $SO_x$ | 2,000 ppm |

Figure 4:
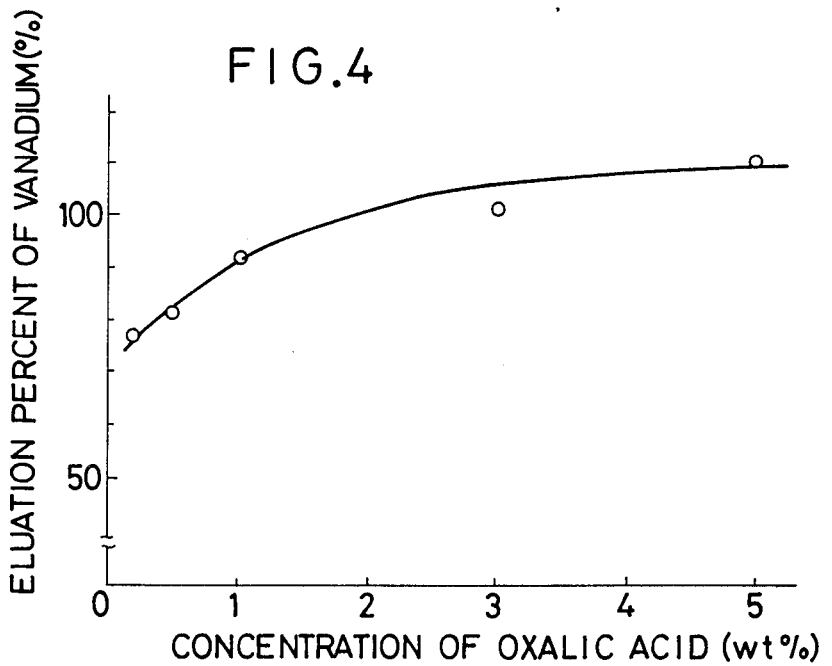
FIG. 4 is a graph illustrating an elution percent of vanadium to a concentration of the aqueous oxalic acid solution in the case that the used tungsten-titania-vanadium catalyst is washed with the aqueous oxalic acid solution.

This catalyst in which the $NO_x$ removal rate had deteriorated and the $SO_2$-oxidizing power had risen was dipped into water and warm water a volume of which was 4 times as much as an apparent volume (calculated from an outside size) of the catalyst, and was washed for a period of 30 to 90 minutes. The used washing water was colored orange due to the elution of vanadium, and chemical analysis was carried out and the results indicate that vanadium was eluted as much as 10 to 20% in the washing water. Further, sodium and potassium were almost all eluted under any condition. After the washing operation, the catalyst was dried (Comparative Example 3). The NOx removal rate and the $SO_2$ oxidization rate was measured where an amount of the gas to be treated was 1/100 of the above-mentioned exhaust gas treatment conditions, and the results indicate that the $SO_2$ oxidization rate was not recovered completely, though the NOx removal rate was recovered almost perfectly, as set forth in the column of Comparative Example 3 in Table 4. Afterward, the catalyst used in Comparative Example 3 was dipped into an oxalic acid solution (60° C.) a volume of which was 4 times as much as an apparent volume of the catalyst, and was washed for 60 minutes. At this time, an elution rate of vanadium from the catalyst varied with a concentration of oxalic acid as shown in FIG. 4. As is apparent from FIG. 4, 90% of the vanadium accumulated on the catalyst was eluted at the oxalic acid concentration of 1.0%, and as the oxalic acid concentration was further heightened, its elution percent increased, eventually up to 100% or more. This phenomenon resulted from the fact that a part of vanadium added as an active component was eluted. The catalyst which had been washed with the aqueous oxalic acid solution was dried (Comparative Example 4). The NOx removal rate and the $SO_2$ oxidization rate were measured, and the results are set forth in the column of Comparative Example 4 in Table 4. As is apparent from the table, the $SO_2$ oxidization rate was recovered up to a level equal to an initial value but an NOx removal rate lowered.

The catalyst which had been used in Comparative Example 4 was impregnated with an aqueous ammonium paratungstate solution which was prepared so as to be impregnated with 5 wt % of a tungsten component in terms of $WO_3$, and drying and calcination were then carried out. The $SO_2$ oxidization rate and the NOx removal rate were then measured, and the results are set forth in the column of Example 4 in Table 4. As be apparent from Table 4, the $SO_2$ oxidization rate and the NOx removal rate were recovered up to levels equal to initial values.

TABLE 4

| | $SO_2$ oxidization rate/$NO_x$ removal rate | | | | |
|---|---|---|---|---|---|
| | Temp. of water | | | | |
| | Ordinary temperature | | | 40° C. | 60° C. |
| | Washing time | | | | |
| | 30 min | 60 min | 90 min | 60 min | 60 min |
| Comparative Example 3 (only water washing) | 1.8/78 | 1.6/80 | 1.3/79 | 1.1/79 | 0.9/79 |
| Comparative Example 4 | 0.7/70 | 0.6/71 | 0.5/71 | 0.5/70 | 0.5/67 |
| Example 1 | 0.6/82 | 0.5/80 | 0.5/81 | 0.5/80 | 0.5/79 |

EXAMPLE 6

A catalyst prepared in the same manner as in Example 5 in which an $SO_2$-oxidizing power had risen was dipped into a 0.1 N aqueous sulfuric acid solution (20° C.) for 60 minutes a volume of which was 4 times as much as an apparent volume of the catalyst, and was washed. Afterward, washing was further carried out with 1.0 wt % of an oxalic acid solution (60° C.) for 60 minutes in the same manner as in Example 4, and the catalyst was impregnated with tungsten, followed by drying and calcination. An $SO_2$ oxidization rate and an NOx removal rate were measured under the same exhaust gas treatment conditions as in Example 4, and values obtained as the results were 0.5% and 1%, respectively.

EXAMPLE 7

Figure 5:
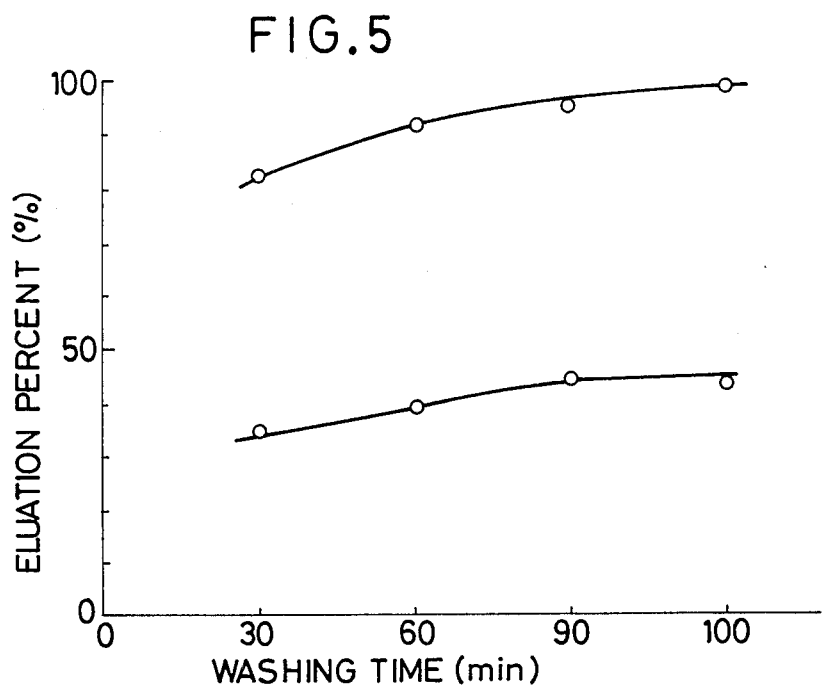
FIG. 5 is a graph illustrating elution percents of vanadium and tungsten to a washing time in the case that the 1.0 wt % aqueous oxalic acid solution is used.

A catalyst prepared in the same manner as in Example 5 in which an NOx removal rate had deteriorated and an $SO_2$-oxidizing power had risen was dipped into water for 60 minutes a volume of which was 4 times as much as an apparent volume of the catalyst, and it was further dipped into a 1.0 wt % aqueous oxalic acid solution (60° C.) a volume of which was 4 times as much as an apparent volume of the catalyst, and was washed for a predetermined period of time. At this time, elution percents of vanadium and tungsten from the catalyst varied as shown in FIG. 5. In FIG. 5, a curve having white circles and a curve having half-blackened circles represent elution rate curves of vanadium and tungsten, respectively. The thus washed catalyst was impregnated with tungsten, followed by drying and calcination. An $SO_2$ oxidization percent and an NOx removal percent were then measured under the same exhaust gas treatment conditions as in Example 5, and the results shown in Table 5 indicate that the $SO_2$ oxidization rate and the NOx removal rate were both recovered up to levels equal to initial values.

TABLE 5

| Washing time | 30 | 60 | 90 | 120 |
|---|---|---|---|---|
| $SO_2$ oxidation rate | 0.6 | 0.5 | 0.5 | 0.5 |
| $NO_x$ removal rate | 80 | 80 | 79 | 78 |

EXAMPLE 8

Figure 6:
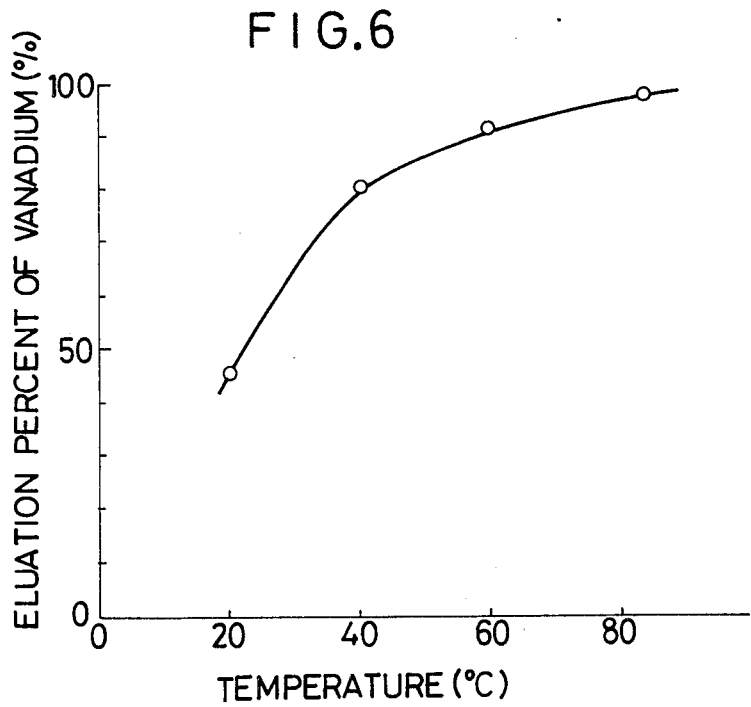
FIG. 6 is a graph illustrating an elution percent of vanadium to a temperature in the case that the 1.0 wt % aqueous oxalic acid solution is used and washing is carried out for a period of 60 minutes.

A catalyst prepared in the same manner as in Example 5 in which an NOx removal rate had deteriorated and the $SO_2$-oxidizing power had risen was dipped into water for 60 minutes a volume of which was 4 times as much as an apparent volume of the catalyst, and it was further dipped into a 1.0 wt % aqueous oxalic acid solution a volume of which was 4 times as much as an apparent volume of the catalyst to wash it. At this time, elution percents of vanadium and tungsten from the catalyst varied as shown in FIG. 6. The thus washed catalyst was impregnated with tungsten, followed by drying and calcination. An $SO_2$ oxidization rate and an NOx removal rate were then measured under the same conditions as in Example 5, and the results shown in Table 6 indicate that the $SO_2$ oxidization rate and the NOx removal rate were both recovered up to a level equal to initial values when a temperature of the aqueous oxalic acid solution was within the range of 40 to 80° C.

TABLE 6

| Temp. of aq. oxalic acid sol. | 20° C. | 40° C. | 60° C. | 80° C. |
|---|---|---|---|---|
| $SO_2$ oxidation rate | 0.8 | 0.5 | 0.5 | 0.4 |
| $NO_x$ removal rate | 80 | 80 | 79 | 78 |

We claim:
1. A method for recovering used tungsten-titania denitrating catalyst in which $SO_2$-oxidizing power has risen due to adhesion or accumulation of dust components, the method comprising washing said used denitrating catalyst with an aqueous oxalic acid solution having a concentration of 0.1 to 5.0 wt % at a temperature within the range of about 20° C. to 100° C.; impregnating said catalyst with a tungsten compound; and drying and calcining said catalyst.

2. A method for recovering used tungsten-titania-vanadium denitrating catalyst, comprising washing said catalyst with water or an aqueous dilute inorganic acid solution; further washing said catalyst with an aqueous oxalic acid solution having a concentration of 0.1 to 5.0 wt % at a temperature within the range of about 20° C. to 100° C.; impregnating said catalyst with a tungsten compound; and drying and calcining said catalyst.

3. The method for recovering a denitrating catalyst according to claim 1 wherein said impregnation of said used denitrating catalyst with the tungsten compound is carried out by impregnating said catalyst with an aqueous tungstate salt solution.

* * * * *